United States Patent [19]

Kang

[11] Patent Number: 5,784,204
[45] Date of Patent: Jul. 21, 1998

[54] VARIABLE MAGNIFICATION VIEWFINDER

[75] Inventor: Hyung-Won Kang, Kyeongsangnam-do, Rep. of Korea

[73] Assignee: Samsung Aerospace Industries, Ltd., Kyungsangnam-do, Rep. of Korea

[21] Appl. No.: 723,836

[22] Filed: Sep. 30, 1996

[30] Foreign Application Priority Data

Oct. 11, 1995 [KR] Rep. of Korea .............. 95-34882

[51] Int. Cl.$^6$ .................. G02B 15/14; G02B 23/00
[52] U.S. Cl. .............. 359/686; 359/431; 359/432; 359/676
[58] Field of Search .................. 359/362, 420–422, 359/431–433, 676–677, 683–684, 686–688, 771, 781, 783; 396/373–386

[56] References Cited

U.S. PATENT DOCUMENTS

| | | | |
|---|---|---|---|
| 5,225,927 | 7/1993 | Nozaki et al. | 359/676 |
| 5,231,534 | 7/1993 | Kato | 359/431 |
| 5,247,324 | 9/1993 | Estelle | 359/676 |
| 5,257,129 | 10/1993 | Morooka et al. | 359/676 |
| 5,406,416 | 4/1995 | Ohtake | 359/686 |
| 5,448,400 | 9/1995 | Kikuchi et al. | 359/432 |
| 5,448,411 | 9/1995 | Morouka | 359/676 |
| 5,587,840 | 12/1996 | Itoh | 359/686 |

FOREIGN PATENT DOCUMENTS

| | | | |
|---|---|---|---|
| 4-168408 | 6/1992 | Japan | 359/432 |
| 4-238314 | 8/1992 | Japan . | |
| 5-34595 | 2/1993 | Japan . | |
| 5-297274 | 11/1993 | Japan . | |
| 6-51201 | 2/1994 | Japan | 359/432 |
| 6-214159 | 8/1994 | Japan . | |

*Primary Examiner*—Thong Nguyen
*Attorney, Agent, or Firm*—Finnegan, Henderson, Farabow, Garrett & Dunner, L.L.P.

[57] ABSTRACT

A variable magnification viewfinder comprises, from the object side, an objective lens group of an overall positive power, including a first lens unit of a negative refractive power, a second lens unit of a positive refractive power, a third lens unit of a positive refractive power and a fourth lens unit of a positive refractive power, wherein the objective lens group forms an actual image of an object, a reverse group for reversing an image formed through the objective lens group, and an eyepiece lens group for observing an image reversed through the reverse group, and where $2.4<L/fw<3.7$, wherein, fw represents the focal length of the objective lens group at a wide angle position, L represents the distance between a closest surface of the objective lens group to the object and the actual image of the object formed by the objective lens group.

5 Claims, 12 Drawing Sheets

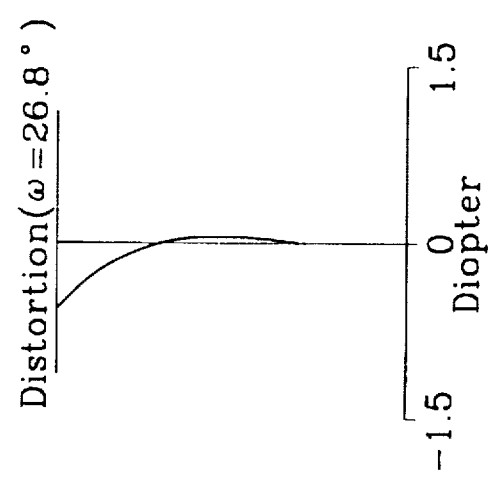
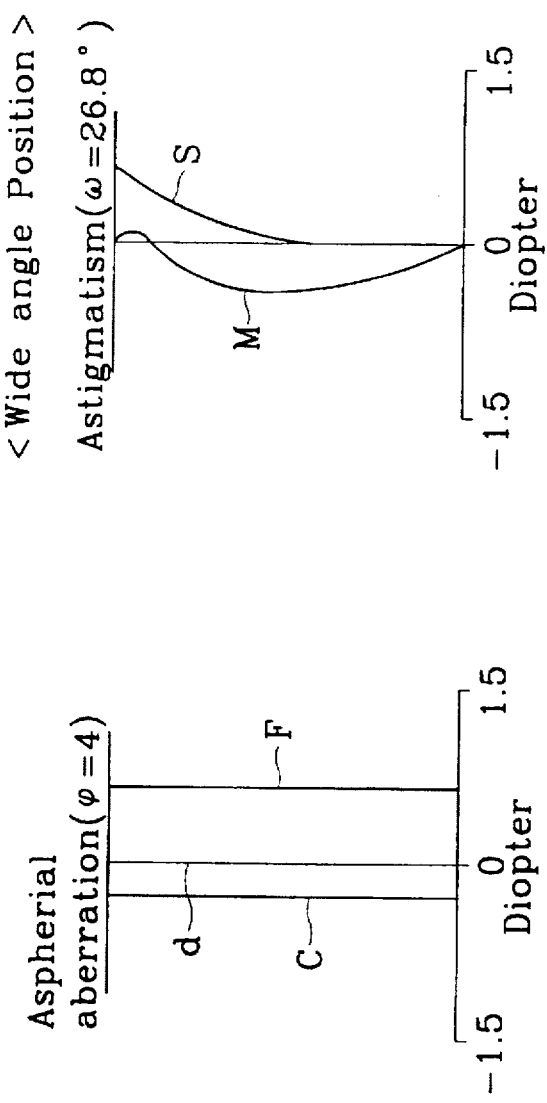

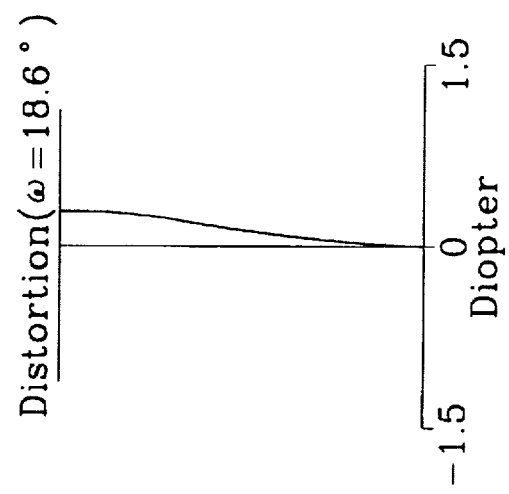
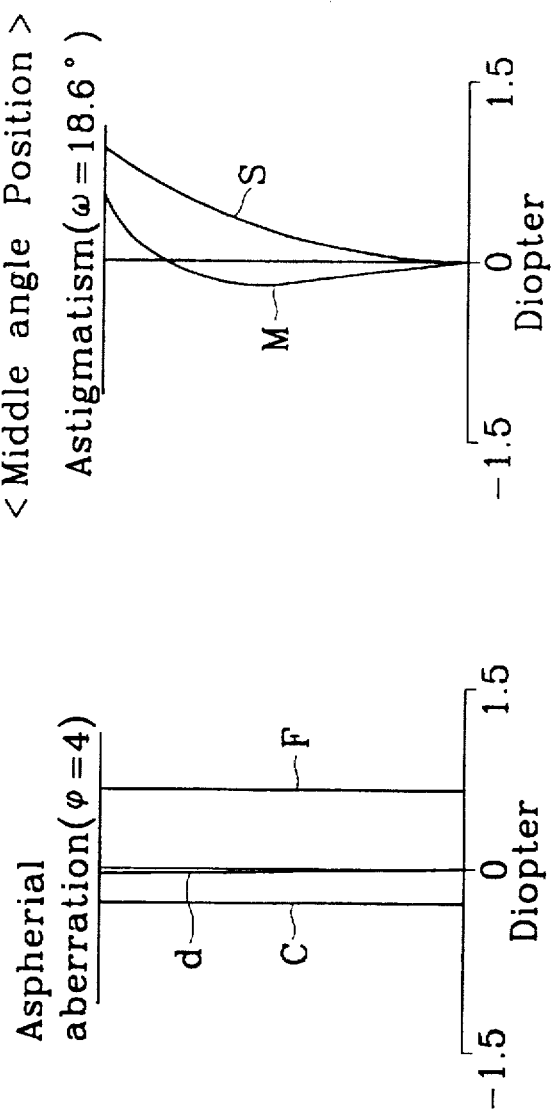
FIG.3A  FIG.3B  FIG.3C

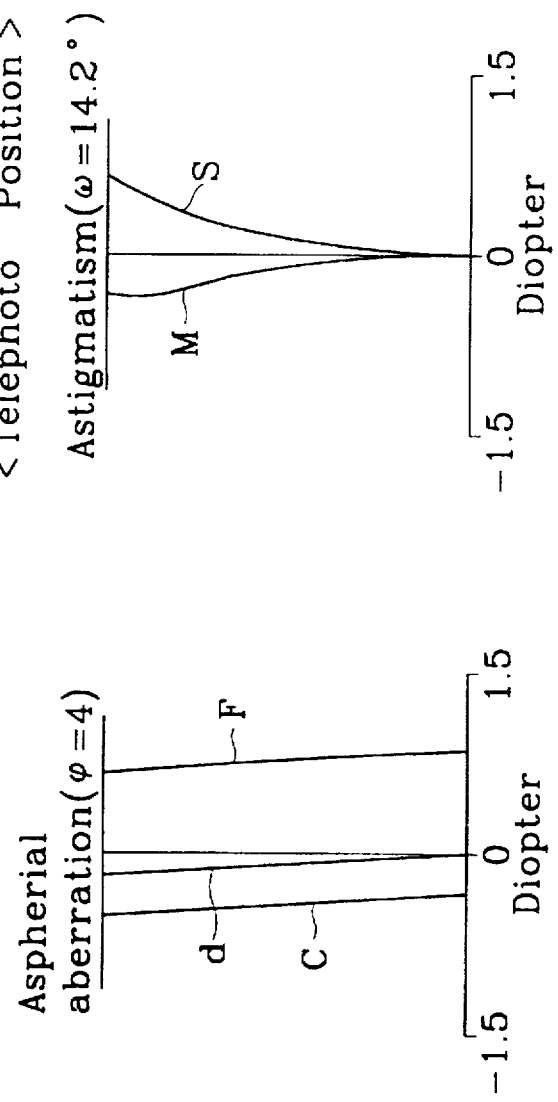
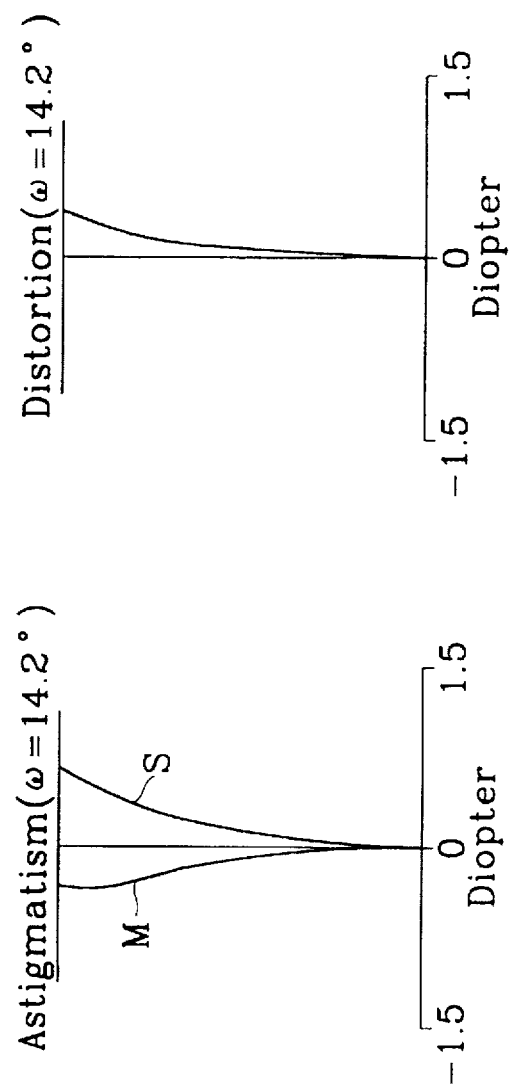
FIG. 4A  FIG. 4B  FIG. 4C

Wide angle Position

Middle Position

Telephoto Position

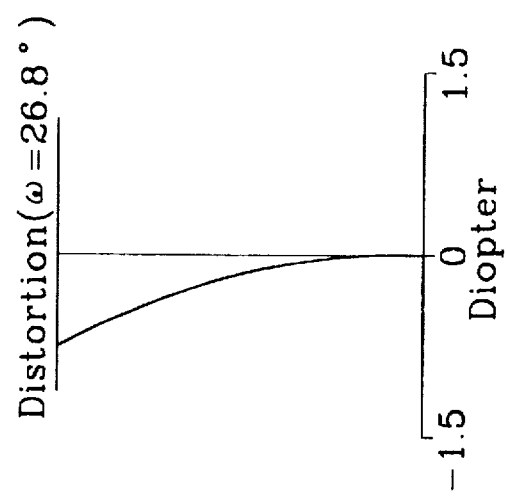
FIG.6C
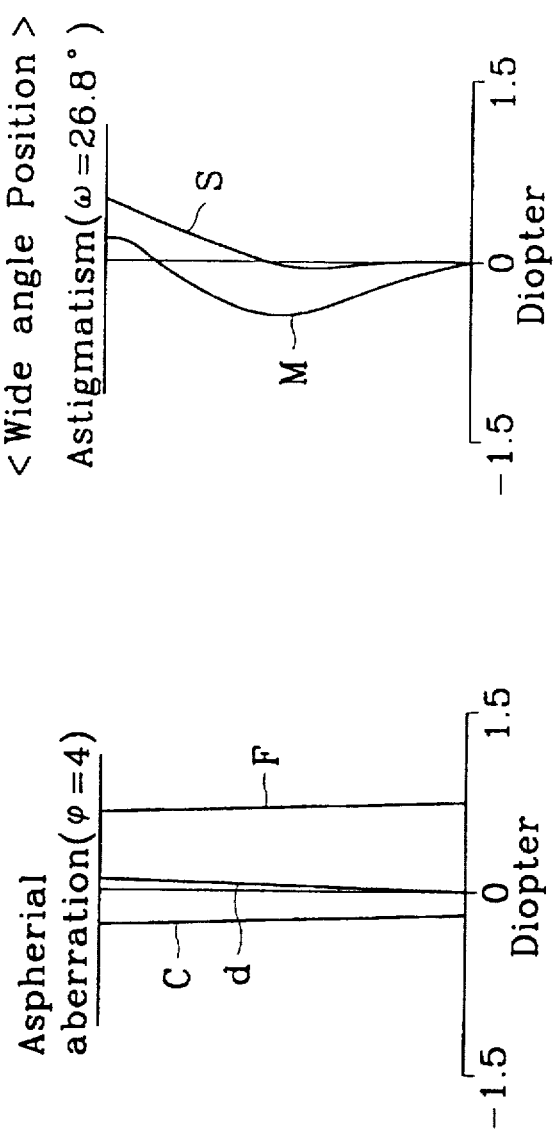
FIG.6B
FIG.6A

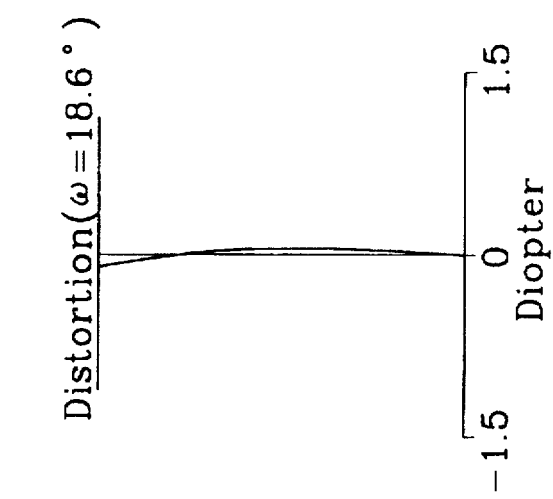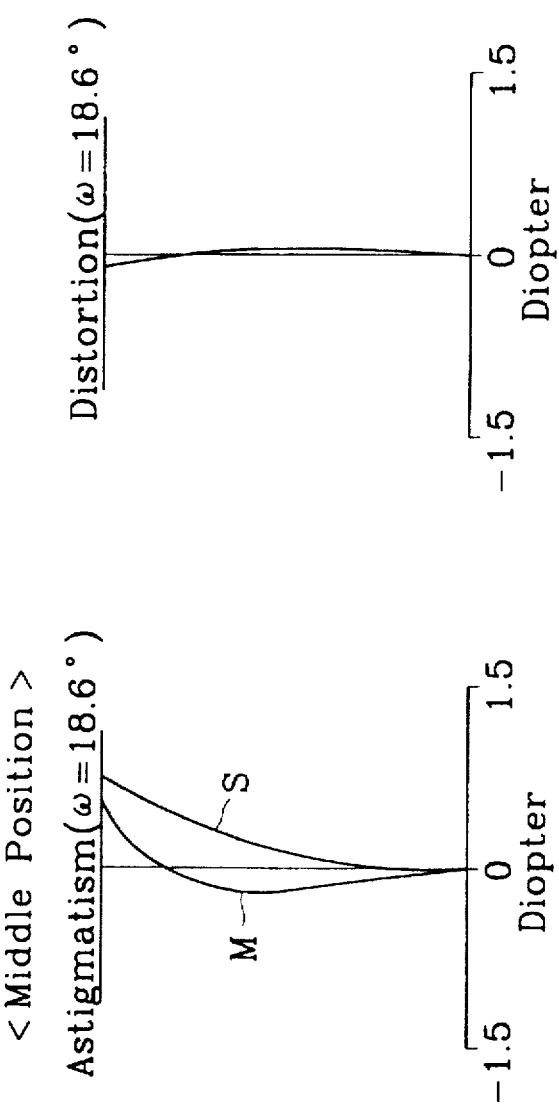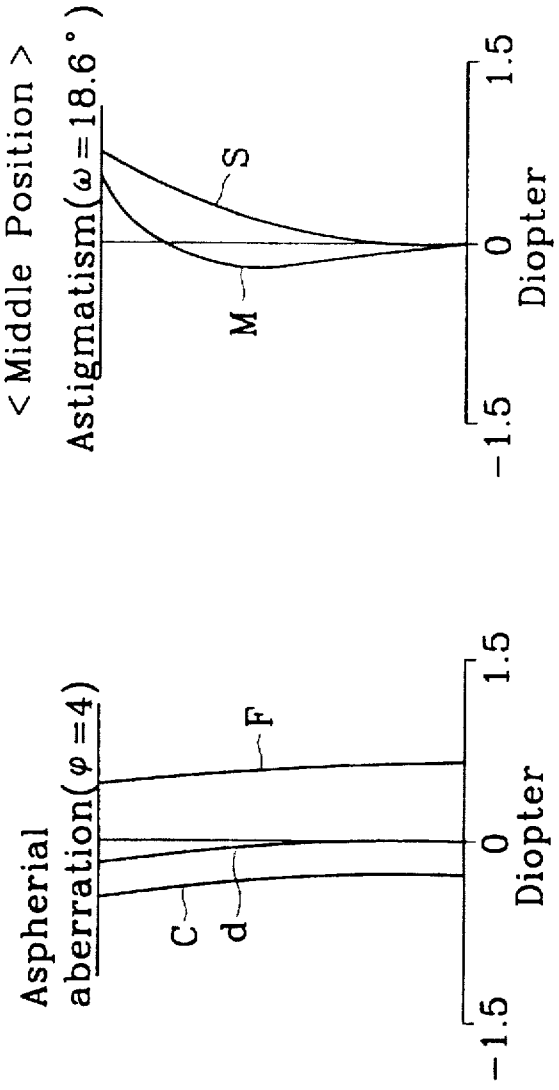

Wide angle Position

Middle Position

Telephoto Position

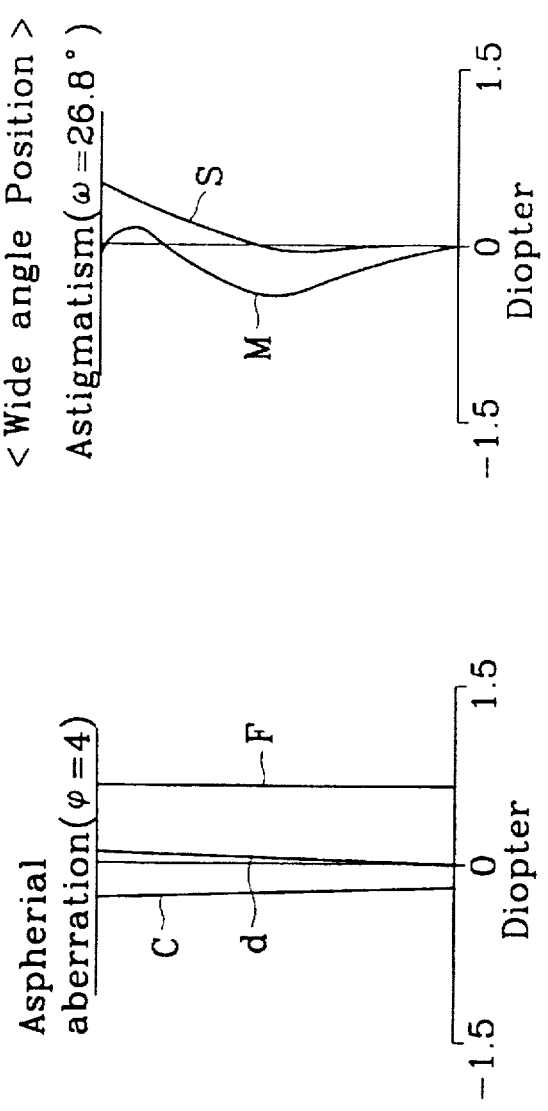

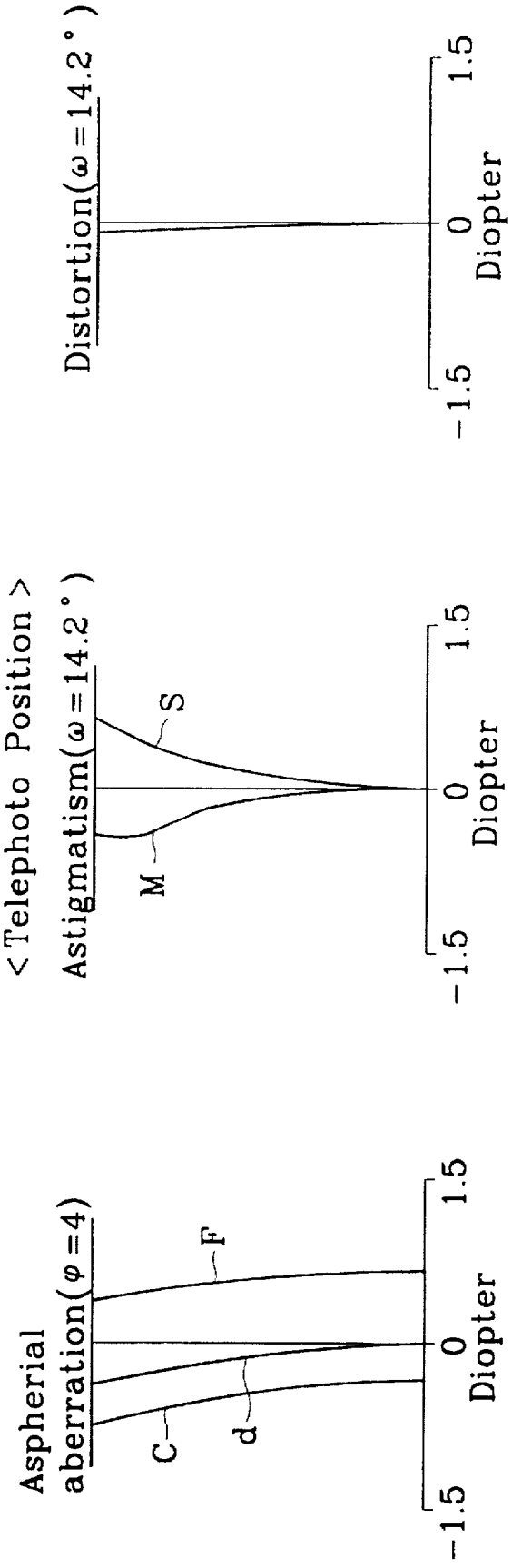

VARIABLE MAGNIFICATION VIEWFINDER

BACKGROUND OF THE INVENTION

1. Field of the Invention

The present invention relates to a variable magnification viewfinder and, more particularly, to a variable magnification viewfinder which performs a variable magnification with a compact construction.

2. Description of the Prior Art

Conventionally, most compact cameras employ a virtual image viewfinder such as an Albada viewfinder or a reverse Galilean viewfinder. Such viewfinders provide a relatively wide angle of view and have a compact construction because a prism is not required to erect the image. However, in such viewfinders, a lens closest to an object must be large, and the view field of the viewfinder blurs in a marginal zone.

Recently, because of the above mentioned drawbacks in virtual image viewfinders, real image viewfinders are employed in their place. Therefore, real image viewfinders are more relevant to developing a photographic optical system of a compact camera with a wide angle view.

Japanese patent laid-open No. 5-34595 proposes a real image variable magnification viewfinder which comprises an objective lens group including a first lens unit of a negative refractive power, a second lens unit of a positive refractive power, and a third lens unit of a positive refractive power.

However, practically, the real image variable magnification viewfinder proposed by Japanese patent laid-open No 5-34595 includes a reflective member of a positive refractive power, so that the construction of the viewfinder becomes more complex, and it is difficult to achieve a compact viewfinder because the moving distance of the third lens unit increases when the magnification is changed.

Japanese patent laid-open No. 5-2972745 proposes a real image variable magnification viewfinder which comprises an objective lens group including a first lens unit of a negative refractive power, a second lens unit of a positive refractive power, and a third lens unit of a positive refractive power, wherein the magnification is changed by moving the second lens unit, and the aberration caused by the variable magnification is compensated by moving the first lens unit.

However, the real image variable magnification viewfinder proposed by Japanese patent laid-open No 5-297244 has a drawback. Namely, it is difficult to control the aberration balance and difficult to construct because of the movement of the first lens unit.

Japanese patent laid-open No. 6-214159 proposes a real image variable magnification viewfinder which has the same construction of the viewfinder proposed by Japanese patent laid-open No. 5-34595.

The real image variable magnification viewfinder proposed by Japanese patent laid-open No. 6-214159 performs variable magnification by moving three lens units. Thus, the construction becomes complex and it is difficult to manufacture the viewfinder.

Japanese patent laid-open No. 4-238314 proposes a real image variable magnification viewfinder which has the same construction of the viewfinder proposed by Japanese patent laid-open No. 5-34595, wherein the second lens unit and the third lens unit perform variable magnification by moving in the opposite direction or in the same direction.

However, the total length of the viewfinder increases and the number of lenses in the second lens unit and in the eyepiece lens group increases.

SUMMARY OF THE INVENTION

In view of the prior art described above, it is an object of the present invention to provide a compact real image variable magnification viewfinder which performs variable magnification with a compact construction.

In order to achieve the above object, according to the present invention, a variable magnification viewfinder comprises from the object side:

an objective lens group of an overall positive refractive power, including a first lens unit of a negative refractive power, a second lens unit of a positive refractive power, a third lens unit of a positive refractive power and a fourth lens unit of a negative refractive power, wherein the objective lens group forms an actual image of an object;

a reverse group for reversing an image formed through the objective lens group;

an eyepiece lens group for observing an image reversed through the reverse group;

wherein magnification is changed by moving the second lens unit and the third lens group along the optical axis of the viewfinder.

BRIEF DESCRIPTION OF THE DRAWINGS

The above object and feature of the present invention will be apparent from the following description of the preferred embodiment with reference to the accompanying drawings.

FIGS. 2A to 2C represent the aberration curves of the first embodiment at a wide angle position;

FIGS. 3A to 3C represent the aberration curves of the first embodiment at a middle position;

FIGS. 4A to 4C represent the aberration curves of the first embodiment at a telephoto position;

FIGS. 6A to 6C represent the aberration curves of the second embodiment at a wide angle position;

FIGS. 7A to 7C represent the aberration curves of the second embodiment at a middle position;

FIGS. 10A to 10C represent the aberration curves of the third embodiment at a wide angle position;

FIGS. 12A to 12C represent the aberration curves of the third embodiment at a telephoto position.

DETAILED DESCRIPTION OF THE PREFERRED EMBODIMENTS

The present invention will be described in detail with reference to the accompanying drawings.

Figure 1A:
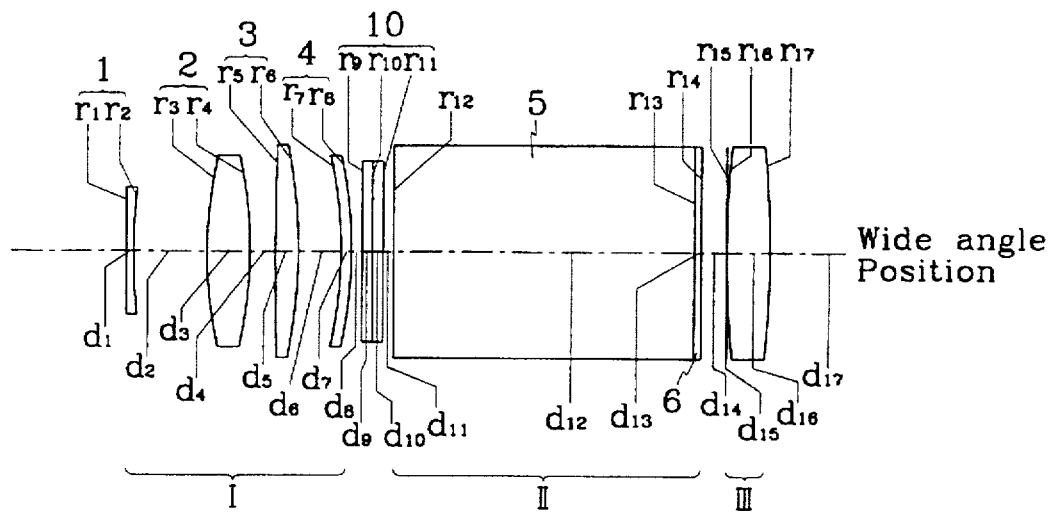
FIGS. 1A to 1C are sectional views of a variable magnification viewfinder according to a first embodiment of the present invention, at a wide angle position, a middle position and a telephoto position respectively.
Figure 1B:
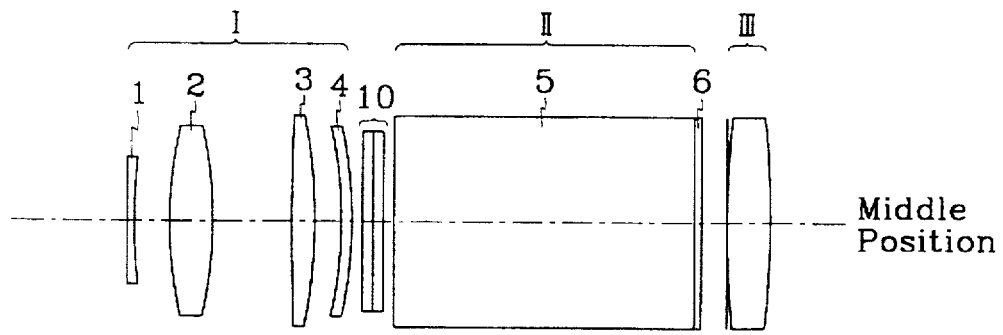
Figure 1C:
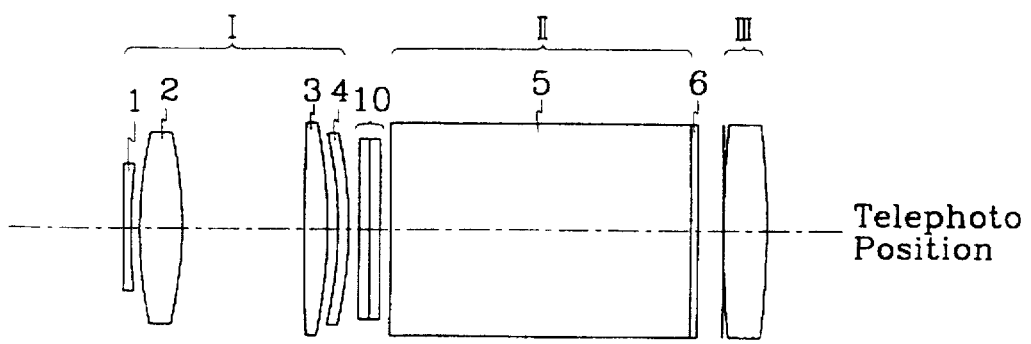
Figure 5A:
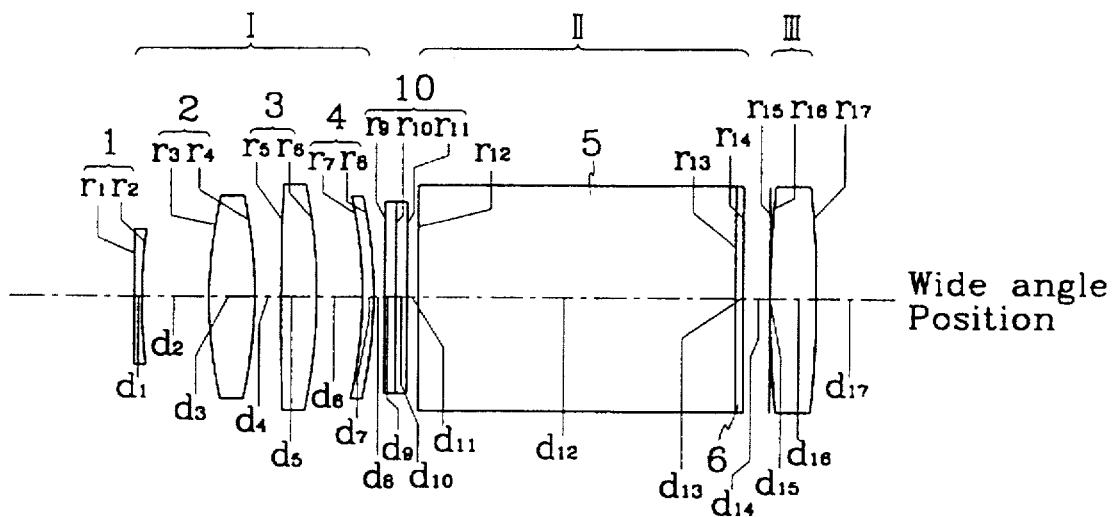
FIGS. 5A to 5C are sectional views of a variable magnification viewfinder according to a second embodiment of the present invention, at a wide angle position, a middle position and a telephoto position respectively.
Figure 5B:
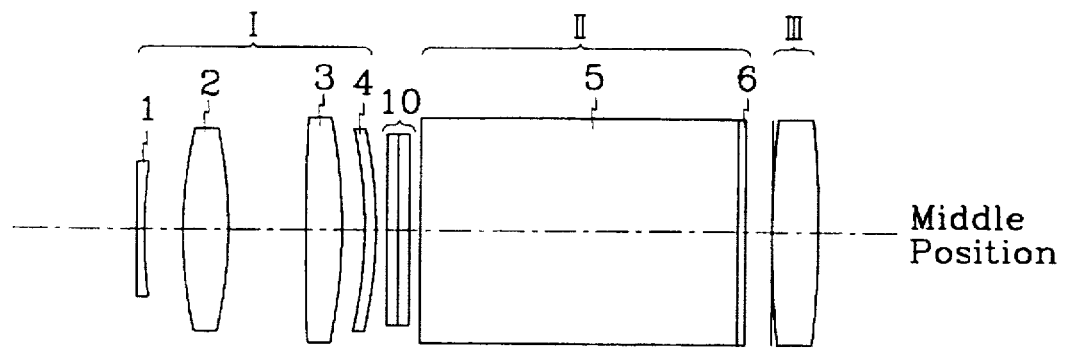
Figure 5C:
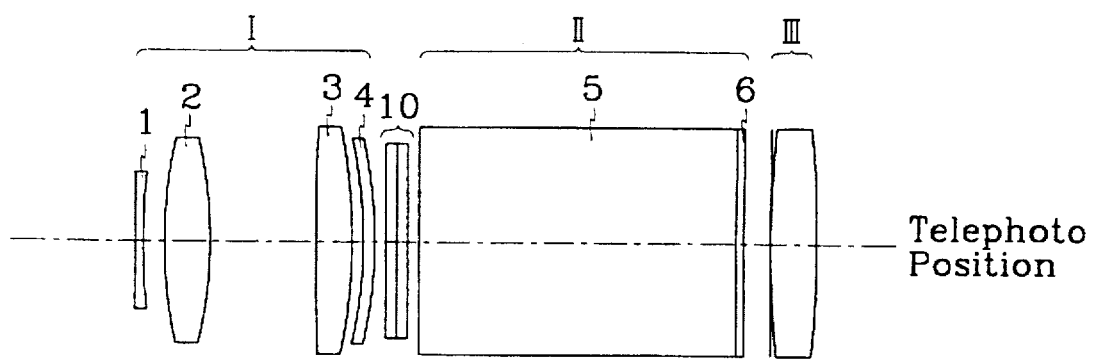
Figures 8A, 8B, 8C:
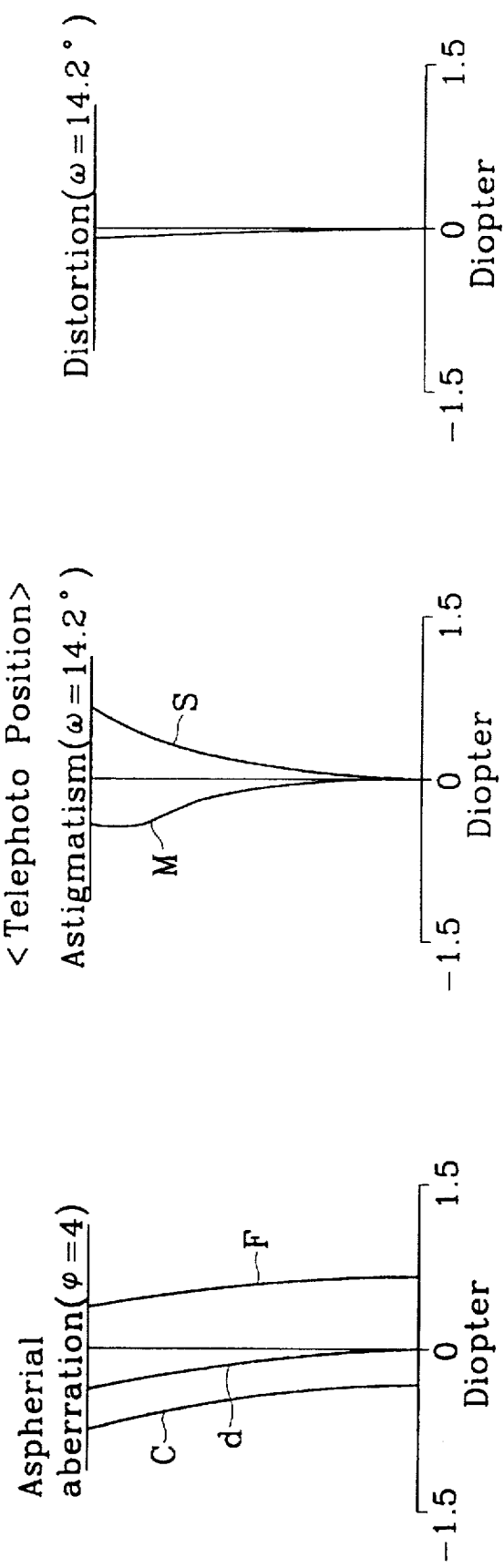
FIGS. 8A to 8C represent the aberration curves of the second embodiment at a telephoto position.
Figure 9A:
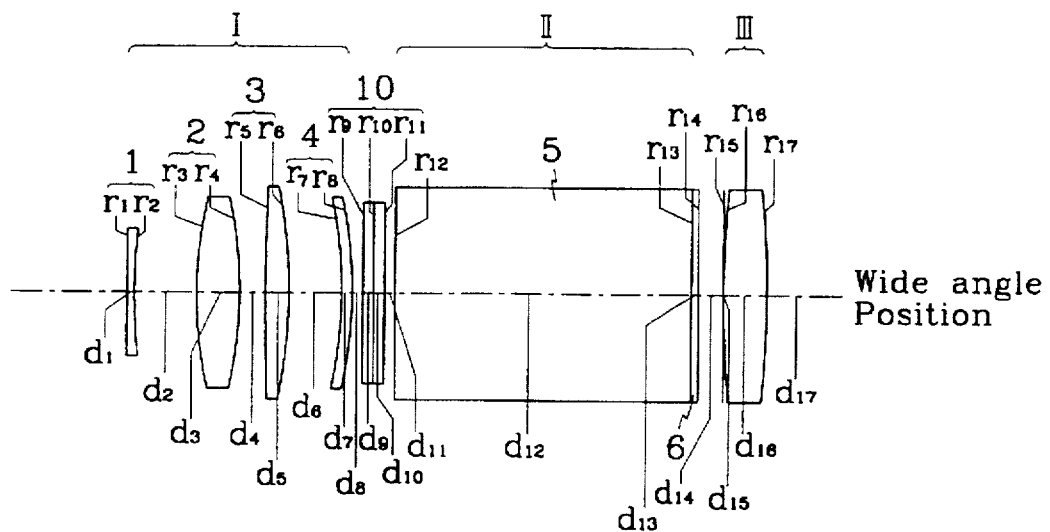
FIGS. 9A to 9C are sectional views of a variable magnification viewfinder according to a third embodiment of the present invention at a wide angle position, a middle position and a telephoto position respectively.
Figure 9B:
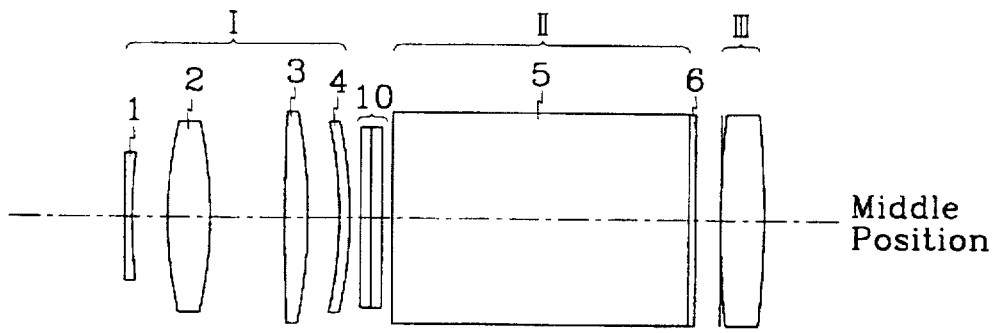
Figure 9C:
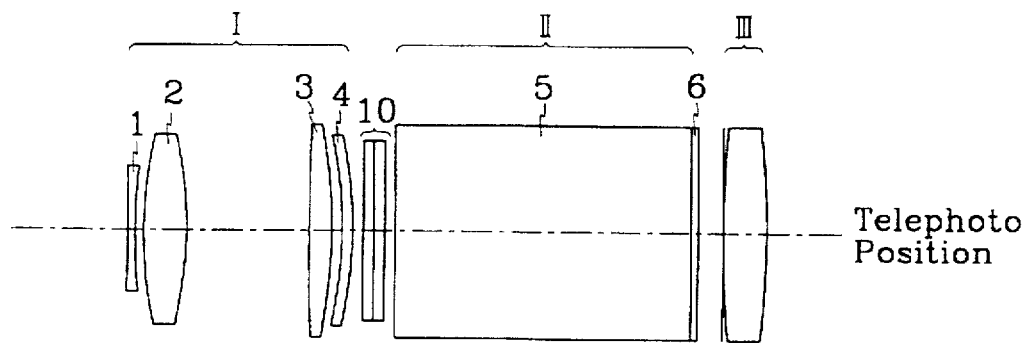
Figure 11A:
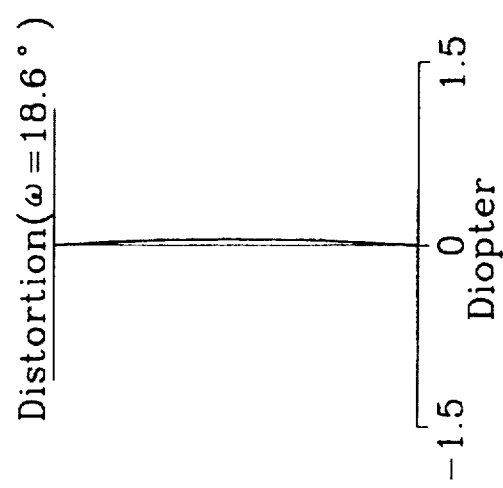
FIGS. 11A to 11C represent the aberration curves of the third embodiment at a middle position.
Figure 11B:
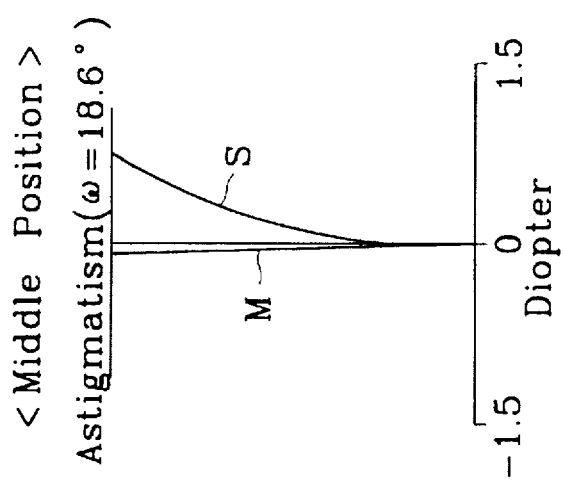
Figure 11C:
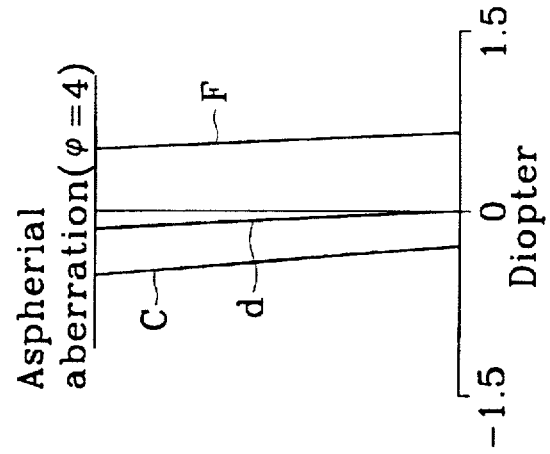

As shown in FIGS. 1, 5 or 9, a variable magnification viewfinder according to an embodiment of the present invention comprises an objective lens group I of a positive refractive power forming an image, a reverse group II reversing the image formed through objective lens group I, and an eyepiece lens group III of a positive refractive power for observing the image reversed through reverse group II.

Objective lens group I includes a fixed first lens 1 of a negative refractive power, a movable second lens 2 of a positive refractive power, a movable third lens 3 of a positive refractive power and a fixed fourth lens 4 of a negative refractive power.

Objective lens group I performs a variable magnification by moving a second lens 2 and a third lens 3 along the optical axis of the viewfinder.

The image field formed through objective lens group I is positioned between objective lens group I and reverse group II.

The embodiment according to the present invention includes an information display optical system 10 between objective lens group I and reverse group II.

Information display optical system 10, as embodied herein, is a liquid crystal device which displays a photographic visual field, a focal point when an auto focus is performed, a visual field that compensates a parallax when photographing, a shutter speed, and an aperture scale, an electrification state of a strobe.

Reverse group II includes a prism 5 for reversing the image formed through objective lens group I and a color filter 6 for more clearly displaying the information displayed by information display optical system 10.

All lenses comprised in the variable magnification viewfinder according to the embodiment are plastic lenses.

The operation of the variable magnification viewfinder according to the embodiment of the present invention is as follows.

The variable magnification viewfinder according to the embodiment of the present invention fulfills the following condition;

[condition 1]

$$2.4 < L/fw < 3.7$$

where, fw represents the effective focal length of the objective lens group I at a wide angle position, and L represents the distance between a closest surface of objective lens group I to an object and the actual image of the object formed by objective lens group I.

If the upper limit of condition 1 is violated, the refractive power of objective lens group I becomes strong, so that a spherical aberration and a distortion at the wide angle position increase, and it becomes difficult to obtain the compact viewfinder.

On the contrary, if the lower limit of the condition 1 is violated, the refractive power of the third lens 3 becomes strong, thereby increasing a curvature of field, the spherical aberration, and the distortion.

In addition, the variable magnification viewfinder according to the embodiment of the present invention fulfills the following condition;

[condition 2]

$$-2.9 < f1/L < -0.7$$

wherein, f1 represents the focal length of first lens 1 of objective lens group I at a wide angle position.

If the upper limit of the condition 2 is violated, the refractive power of first lens 1 of objective lens group I becomes large, thereby increasing all aberrations such as the spherical aberration.

On the contrary, if the lower limit of the condition 2 is violated, a shape of first lens 1 becomes a meniscus shape and the refractive power of third lens 3 increases. As a result, the productivity of the variable magnification viewfinder decreases.

In addition, the variable magnification viewfinder according to the embodiment of the present invention fulfills the following condition;

[condition 3]

Third lens 3 of objective lens group I has at least one aspherical surface.

If the condition 3 is violated, the spherical aberration increases.

In addition, the variable magnification viewfinder according to the embodiment of the present invention fulfills the following condition;

[condition 4]

The lens surface of third lens 3 of objective lens group I closest to the image field is convex toward the image field formed through objective lens group I.

If condition 4 is violated, distortions and all aberrations increase.

In addition, the variable magnification viewfinder according to the embodiment of the present invention fulfills the following condition;

[condition 5]

Fourth lens 4 of the objective lens group I is a meniscus type lens which a surface of fourth lens 4 closest to the object and a surface of fourth lens 4 closest to the image field have a curvature radius of the same sign.

If condition 5 is satisfied, the refractive power of fourth lens 4 decreases. As a result, the refractive power of each lens unit discreases, and it becomes easy to compensate for aberrations and to construct a compact viewfinder.

Each lens unit according to the embodiment of the present invention is made of low-priced plastic such as PMMA. In addition, the refractive power of each lens group is properly divided to enable the use of simple shaped lenses.

The eyesight correction of the viewfinder which satisfies the above mentioned conditions is performed by moving the eyepiece of lens group III in small increments.

A coefficient of an aspherical lens of the variable magnification viewfinder according to the embodiment which satisfies the above mentioned conditions 1 to 5 is expressed by the following equation.

$$Z = \frac{Cy^2}{1 + \{1 - (K+1)C^2y^2\}^{1/2}} + A_4 y^4 + A_6 y^6 + A_8 y^8 + A_{10} y^{10}$$

wherein,

Z represents the optical axial distance from the lens vertex
y represents the vertical distance of the optical axis
C represents the reciprocal of the radius of curvature
K represents the conic number $A_4$, $A_6$, $A_8$, $A_{10}$ represent aspherical coefficients Values which satisfy the above-mentioned conditions are described below.

A radius of curvature of a refractive surface is $r_i$ (i=1~17), a lens thickness or a distance between lenses is $d_i$(i=1~17), a d-line refractive indices of a lens is ni, an Abbe number of a lens is v, a magnification of an overall optical system equals m, and a half viewing angle is ω.

Values for the first embodiment of the present invention are shown in table (1) in which the viewing angle 2ω ranges from 28.4° to 53.3° and the magnification m ranges from −0.32 to 0.57.

TABLE 1

| surface | radius of a curvature (ri) | thickness or distance (di) | refractive power (ni) | abbe number (v) |
|---|---|---|---|---|
| 1 | −139.739 | 0.80 | 1.49176 | 57.4 |
| 2 | 15.247 | variable | | |
| *3 | 9.766 | 3.60 | 1.49176 | 57.4 |
| 4 | −10.445 | variable | | |
| 5 | 99.342 | 1.88 | 1.49176 | 57.4 |
| *6 | −7.660 | variable | | |
| 7 | −7.277 | 0.80 | 1.49176 | 57.4 |
| 8 | −9.105 | 0.80 | | |
| 9 | ∞ | 0.75 | 1.51680 | 64.2 |
| 10 | ∞ | 0.55 | 1.51680 | 64.2 |
| 11 | ∞ | 0.95 | | |
| 12 | ∞ | 27.20 | 1.49176 | 57.2 |
| 13 | ∞ | 0.20 | 1.51680 | 64.2 |
| 14 | ∞ | 2.31 | | |
| 15 | ∞ | 0.00 | | |
| *16 | 28.280 | 4.00 | 1.49176 | 57.4 |
| 17 | −18.831 | 17.00 (EP) | | | where * represents an aspherical surface.

In the first embodiment of the present invention, the above-mentioned distances between lenses and the coefficient of the aspherical surface vary according to a view angle as shown in table 2 and 3.

TABLE 2

| | 2ω = 53.3° | 2ω = 37.1° | 2ω = 28.4° |
|---|---|---|---|
| d2 | 5.932 | 2.501 | 0.800 |
| d4 | 2.694 | 7.917 | 11.164 |
| d6 | 4.340 | 2.551 | 1.000 |

TABLE 3

| | aspherical coefficient of the third surface | aspherical coefficient of the sixth surface | aspherical coefficient of the sixteenth surface |
|---|---|---|---|
| K | 0.2182160920269E +1 | −0.7300851487123E +1 | −0.9762443835596E+1 |
| A4 | −0.9488396404389E −3 | −0.7004372790155E −3 | 0.0000000000000 |
| A6 | 0.2740703243691E −4 | 0.2478907148298E −4 | 0.0000000000000 |
| A8 | −0.2036774984240E −5 | −0.3489227134026E −6 | 0.0000000000000 |
| A10 | 0.3140298388735E −7 | 0.7399175490089E −9 | 0.0000000000000 |

Values for the second embodiment of the present invention are shown in table (4) in which the viewing angle 2ω ranges from 28.4° to 53.3° and the magnification m ranges from −0.32 to −0.57.

TABLE 4

| surface | radius of curvature (ri) | thickness or distance (di) | refractive power (ni) | abbe number (v) |
|---|---|---|---|---|
| 1 | −78.349 | 1.50 | 1.49176 | 57.4 |
| 2 | 15.907 | variable | | |
| *3 | 10.234 | 4.00 | 1.49176 | 57.4 |
| 4 | −11.063 | variable | | |
| 5 | 83.297 | 3.00 | 1.49176 | 57.4 |
| *6 | −7.819 | variable | | |
| 7 | −8.450 | 1.00 | 1.49176 | 57.4 |
| 8 | −10.300 | 0.80 | | |
| 9 | ∞ | 0.75 | 1.51680 | 64.2 |
| 10 | ∞ | 0.55 | 1.51680 | 64.2 |
| 11 | ∞ | 0.95 | | |
| 12 | ∞ | 27.20 | 1.49176 | 57.2 |
| 13 | ∞ | 0.20 | 1.51680 | 64.2 |
| 14 | ∞ | 2.78 | | |
| 15 | ∞ | 0.00 | | |
| *16 | 24.262 | 4.00 | 1.49176 | 57.4 |
| 17 | −21.871 | 17.00 (EP) | | | where * represents an aspherical surface

In the second embodiment of the present invention, the above-mentioned distances between lenses and the coefficients of the aspherical surface vary according to a view angle as shown in tables 5 and 6.

TABLE 5

| | 2ω = 53.3° | 2ω = 37.1° | 2ω = 28.4° |
|---|---|---|---|
| d2 | 7.960 | 4.445 | 2.676 |
| d4 | 2.850 | 8.155 | 11.474 |
| d6 | 4.340 | 2.551 | 1.000 |

TABLE 6

|   | aspherical coefficient of the third surface | aspherical coefficient of the sixth surface | aspherical coefficient of the sixteenth surface |
|---|---|---|---|
| K | 0.1758557297012E +1 | −0.7900114217401E +1 | −0.8175574188541E+1 |
| A4 | −0.9737447786864E −3 | −0.8923736804123E −3 | 0.0000000000000 |
| A6 | 0.7854134965352E −4 | 0.3209153428591E −4 | 0.0000000000000 |
| A8 | −0.6690230534802E −5 | −0.2505562753186E −6 | 0.0000000000000 |
| A10 | 0.1820844842439E −6 | −0.1099227973130E −7 | 0.0000000000000 |

Values for the third embodiment of the present invention are shown in table 7 in which the viewing angle $2\omega$ ranges from 28.4° to 53.3° and the magnification m ranges from −0.32 to −0.57.

TABLE 7

| surface | radius of curvature (ri) | thickness or distance (di) | refractive power (ni) | abbe number (v) |
|---|---|---|---|---|
| 1 | 75.109 | 0.80 | 1.49176 | 57.4 |
| 2 | 13.995 | variable | | |
| *3 | 9.214 | 2.40 | 1.49176 | 57.4 |
| 4 | −12.697 | variable | | |
| 5 | ∞ | 1.86 | 1.49176 | 57.4 |
| *6 | −6.629 | variable | | |
| 7 | −7.000 | 1.00 | 1.49176 | 57.4 |
| 8 | −7.930 | 0.80 | | |
| 9 | ∞ | 0.75 | 1.51680 | 64.2 |
| 10 | ∞ | 0.55 | 1.51680 | 64.2 |
| 11 | ∞ | 0.95 | | |
| 12 | ∞ | 27.20 | 1.49176 | 57.2 |
| 13 | ∞ | 0.20 | 1.51680 | 64.2 |
| 14 | ∞ | 3.30 | | |
| 15 | ∞ | 0.00 | | |
| *16 | 26.562 | 4.00 | 1.49176 | 57.4 |
| 17 | −21.060 | 17.00 (EP) | | | where * represents an aspherical surface

In the third embodiment of the present invention, the above-mentioned distance between lenses and the coefficient of the aspherical surface vary according to a view angle as shown in tables 8 and 9.

TABLE 8

|   | $2\omega = 53.3°$ | $2\omega = 37.1°$ | $2\omega = 28.4°$ |
|---|---|---|---|
| d2 | 5.973 | 2.427 | 0.800 |
| d4 | 2.076 | 7.353 | 10.606 |
| d6 | 4.340 | 2.551 | 1.000 |

TABLE 9

|   | aspherical coefficient of the third surface | aspherical coefficient of the sixth surface | aspherical coefficient of the sixteenth surface |
|---|---|---|---|
| K | 0.1567480925379E +1 | −0.6544393208444E +1 | −0.9205846971265E+1 |
| A4 | −0.9062392257513E −3 | −0.9594690874559E −3 | 0.0000000000000 |
| A6 | 0.3696955047015E −4 | 0.2337760590600E −4 | 0.0000000000000 |
| A8 | 0.2717427325575E −5 | 0.2862749166846E −6 | 0.0000000000000 |
| A10 | 0.6400757233230E −7 | 0.1495605052993E −7 | 0.0000000000000 |

Values for conditions in accordance with the first to the third embodiments of the present invention are shown in table 10

TABLE 10

| condition | the first embodiment | the second embodiment | the third embodiment |
|---|---|---|---|
| f1 | −27.907 | −26.750 | −35.128 |
| fw | 7.634 | 7.640 | 7.640 |
| L | 21.60 | 26.0 | 20.0 |
| L/fw | 2.83 | 3.40 | 2.62 |
| f1/L | −1.29 | −1.03 | −1.76 |

As described above, the present invention, in accordance with the embodiment, constitutes a variable magnification viewfinder which has an acceptable aberration performance throughout the entire range, from a wide angle position to a telephoto angle position. In addition, it is possible to compact the variable magnification viewfinder because of a compact construction and using inexpensive material.

Also, it is easy to manufacture the variable magnification viewfinder since the lenses used are relatively simple in shape and use of aspherical surfaces is minimized. Thereby, the productivity of the variable magnification viewfinder is improved.

While it has been shown and described what are at present the embodiments of the invention, it will be obvious to those skilled in the art that various changes and modifications can be readily made therein without departing from the scope and spirit of the invention as defined by the appended claims.

What is claimed is:

1. A variable magnification viewfinder comprising:
an objective lens group having an overall positive power, including, from an object side, a fixed first lens unit of a negative refractive power, a second lens unit of a positive refractive power, a third lens unit of a positive refractive power and a fixed fourth lens unit of a negative refractive power, wherein the objective lens group forms an actual image of an object;
a reverse group for reversing the image formed by the objective lens group; and
an eyepiece lens group for observing the image reversed by the reverse group;
wherein magnification is changed by moving the second lens unit and the third lens unit along an optical axis of the viewfinder, and wherein the variable magnification viewfinder fulfills the following condition:

$$2.4 < L/fw < 3.7$$

where, fw represents a focal length of the objective lens group at a wide angle position.

L represents the distance between a closest surface of the objective lens group to the object and the image of the object formed by the objective lens group.

2. The variable magnification viewfinder of claim 1, wherein the variable magnification viewfinder fulfills the following condition:

$$-2.9 < f_1/L < -0.7$$

where, $f_1$ represents a focal length of the first lens unit of the objective lens group.

3. The variable magnification viewfinder of claim 1, wherein the third lens unit of the objective lens group has at least one aspherical surface.

4. The variable magnification viewfinder of claim 1, wherein the fourth lens unit of the objective lens group is a meniscus type lens with a surface of the fourth lens unit closest to the object and a surface of the fourth lens unit closest to an image field each surface having a curvature radius of the same sign.

5. The variable magnification viewfinder of claim 1, wherein a surface of the third lens unit of the objective lens group closest to the image is convex toward the actual image of the object.

* * * * *